United States Patent
Karlsson et al.

(10) Patent No.: US 8,254,150 B2
(45) Date of Patent: Aug. 28, 2012

(54) INVERTER WITH COMMUTATION CIRCUIT

(75) Inventors: Rolf Karlsson, Laxå (SE); Per Andersson, Fagersanna (SE); Dan Wessman, Tived (SE)

(73) Assignee: ESAB AB, Gothenburg (SE)

( * ) Notice: Subject to any disclaimer, the term of this patent is extended or adjusted under 35 U.S.C. 154(b) by 0 days.

(21) Appl. No.: 13/395,603

(22) PCT Filed: Sep. 14, 2009

(86) PCT No.: PCT/EP2009/061872
§ 371 (c)(1),
(2), (4) Date: Apr. 1, 2012

(87) PCT Pub. No.: WO2011/029482
PCT Pub. Date: Mar. 17, 2011

(65) Prior Publication Data
US 2012/0195086 A1    Aug. 2, 2012

(51) Int. Cl.
*H02J 3/38* (2006.01)
(52) U.S. Cl. .............. 363/35; 307/66; 307/109
(58) Field of Classification Search ............ 307/66, 307/109, 48, 44; 363/35
See application file for complete search history.

(56) References Cited

U.S. PATENT DOCUMENTS 5,111,058 A *  5/1992  Martin ........................ 307/66
6,330,170 B1  12/2001  Wang et al.
6,333,611 B1  12/2001  Shibuya

FOREIGN PATENT DOCUMENTS

EP    1422011 A2    5/2004
EP    1484832 A2    12/2004

OTHER PUBLICATIONS

International Preliminary Report on Patentability dated Jan. 18, 2012, issued in connection with PCT/EP2009/061872 filed Sep. 14, 2009, ESAB AB.
International Search Report issued May 7, 2010, in connection with PCT/EP2009/061872 filed Sep. 14, 2009, ESAB AB.
PCT Demand filed on Jun. 23, 2011, in connection with PCT/EP2009/061872 filed Sep. 14, 2009, ESAB AB.

* cited by examiner

*Primary Examiner* — Shawn Riley (57) ABSTRACT

An inverter provides alternating current (iout) to a load (130) containing a welding circuit. The inverter includes at least one commutation circuit (110) and a bridge circuit (120) connected to a bus forwarding power from a DC power source (100). The bus is also galvanically connected to the load (130) via the bridge circuit (120). The at least one commutation circuit (110) receives power from the DC power source (100); receives energy from inductive elements in the load (130) during a storage phase of a cyclic procedure, and controls energy feedback to the load (130) during a feedback phase of the cyclic procedure. The at least one commutation circuit (110) is a two-pole having a first pole (p1) connected to a first node (A) and a second pole (p2) connected to a second node (B). The at least one commutation circuit (110) is arranged to receive energy from the load (130) and feedback energy to the load (130) via the first and second nodes (A; B), either directly or via the bridge circuit (120). Energy-flow control means ($D_{IN}$, $S_{OUT}$) in each of the at least one commutation circuit (110) control energy to be stored in and taken out from a recovery capacitor (CR) in the commutation circuit (110) in question. The bridge circuit (120) delivers the alternating current (iout) to the load (130).

12 Claims, 5 Drawing Sheets

PRIOR ART

INVERTER WITH COMMUTATION CIRCUIT

THE BACKGROUND OF THE INVENTION AND PRIOR ART

The present invention relates generally to power sources for providing alternating current, for example to be used in welding apparatuses. More particularly the invention relates to an inverter or providing alternating current to a load including a welding circuit, a method of controlling an inverter to provide alternating current to a load including a welding circuit, an internal memory comprising software for controlling the steps of a method for controlling an inverter to provide alternating current to a load including a welding circuit and a computer readable medium for controlling a computer to perform the steps of a method for controlling an inverter to provide alternating current to a load including a welding circuit.

The purpose of an inverter is to generate alternating current to a load. For some applications it is important that the current provided to the load has a true sinus wave shape. Other implementations may require that the power dissipation in the load is as constant as possible. In the latter case, it is key that the current direction be reversed as rapidly as possible, i.e. that the current as a function of time has a shape being as close as possible to a square wave. Inverters for welding current sources normally represent implementations where a square-wave shaped current is desirable. Namely, in addition to providing relatively constant power dissipation in the load, this reduces the risk of arc outage in connection with reversing the current.

The patent document EP 1 422 011 discloses a welding-type power supply unit, which includes a so-called snubber circuit. The snubber circuit recovers energy that would otherwise not be used, and thus economizes the energy usage. The snubber circuit also protects various components in the circuitry from harmful voltage spikes. Additionally, free-wheeling switches here provide a freewheeling current path for any energy having been stored temporarily in the snubber inductor.

The known snubber-circuit design may be advantageous from an energy-efficiency point-of-view. However, the freewheeling switches render the design complex. Each switch also requires a specific control signal, which require that processing tasks be executed by a control unit.

SUMMARY OF THE INVENTION

The object of the present invention is therefore to alleviate the above problems and provide an efficient, uncomplicated and cost-efficient inverter for welding implementations.

According to a first aspect of the invention, the object is achieved by the initially described inverter, wherein the at least one commutation circuit is a two-pole having a first pole connected to a first node and a second pole connected to a second node. The at least one commutation circuit is arranged to receive energy from the load and feedback energy to the load via the first and second nodes, either directly or via the bridge circuit.

This inverter is advantageous because it renders the inverter design very straightforward while minimizing the processing tasks to be handled by the control unit for the inverter.

According to one preferred embodiment of this aspect of the invention, the energy-flow control means are arranged in a switching module. This module, in turn, includes first and second flow control means. The first flow control means is configured to allow energy to be stored in the recovery capacitor, and the second flow control means is configured to cause energy stored in the recovery capacitor to be fed into the load. Thus, by manipulating the flow control means, it is possible to control the amount of energy stored in the recovery capacitor. For example, the flow control means may be controlled so that a larger amount of energy is stored in the recovery capacitor in a subsequent phase of the cyclic procedure if, in a given phase of the cyclic procedure, a voltage over the recovery capacitor is found to be relatively low; and vice versa.

According to another preferred embodiment of this aspect of the invention, the switching module is connected in series with the recovery capacitor. Such a design is desirable since no inductors are needed to attain the intended inverter function. This, in turn, is beneficial because thereby relatively high average power can be fed into the load. The risk of arc outage in connection with reversing the output current is likewise reduced. Namely, the low inductance of the circuit enables quick reversing of the output current (i.e. allows the load current to have high time derivative during the commutation) also when the current level is relatively high and/or when the load has comparatively high inductance.

According to still another preferred embodiment of this aspect of the invention, the first flow control means is connected in parallel with the second flow control means. Hence, the flow control means are effectively operable bidirectionally, i.e. capable of both filling energy into the recovery capacitor and taking out energy there from in a very straightforward manner.

According to a further preferred embodiment of this aspect of the invention, the second flow control means is controllable in response to a control signal. Thereby, energy may be conveniently output from the recovery capacitor. It is likewise rendered possible to cause a given amount of energy to be stored in the recovery capacitor. Preferably, the first flow control means includes a diode and the second flow control means includes a transistor.

According to yet another preferred embodiment of this aspect of the invention, the bridge circuit includes four main switching modules, which are arranged in a full (or H-) bridge configuration between the first and second nodes. The main switching modules are configured to be controlled in a pair-wise alternating manner, such that a first pair causes the output current to flow in a first direction through the load, and a second pair causes the output current to flow in a second direction (opposite to the first direction) through the load. Thus, the characteristics of the output current are conveniently controllable via a control unit associated with the inverter. Moreover, no center-point line is required, which simplifies the design somewhat.

According to still another preferred embodiment of this aspect of the invention, the bus includes a center-point line having a voltage level between a first voltage level of the first line and a second voltage level of the second line. The inverter further includes first and second commutation circuits. The first commutation circuit has its first pole connected to the first node and its second pole connected to the center-point line. The second commutation circuit has its first pole connected to the center-point line and the second pole connected to the second node. The bridge circuit here has two main switching modules that are arranged in a half bridge configuration between the first and second nodes. The main switching modules are configured to be controlled in an alternating manner, such that a first module causes the output current to flow in a first direction through the load, and a second module causes the output current to flow in a second direction through the load, where again, the second direction is opposite to the first direction. This half bridge configuration is advantageous because the energy to be stored is fed into two recovery capacitors (instead of a single ditto). Consequently, the voltage across each commutation circuit's switching module is reduced, and as a result, the requirements on the components therein can be relaxed. Naturally, this is beneficial from an overall cost/reliability point-of-view. Furthermore, since the load current only passes one switching module at the time, the losses in the bridge circuit are reduced significantly.

According to yet another preferred embodiment of this aspect of the invention, the inverter includes first and second commutation circuits which are arranged anti-parallel over the load. A first commutation circuit has the first pole connected to the first node and the second pole connected to the second node. The first commutation circuit is configured to store energy from the load when the output current has a first flow direction through the load and feed back energy to the load when the output current has a second flow direction through the load. A second commutation circuit has the first pole connected to the second node and the second pole connected to the first node. The second commutation circuit is configured to store energy from the load when the output current has the second flow direction through the load and feed back energy to the load when the output current has the first flow direction through the load. The second flow direction is opposite to the first flow direction. This arrangement is advantageous because it is compatible with a bridge circuit of H-type as well as half-type.

According to a further preferred embodiment of this aspect of the invention, the bus includes at least one smoothing inductor configured to suppress voltage ripple on the bus. Thereby, the load can be provided with a relatively spurious-free output current.

According to still a further preferred embodiment of this aspect of the invention, the inverter includes at least two commutation circuits, which are coupled in parallel with one another over the first and second nodes. Here, each commutation circuit is adapted to a respective energy range to be handled (i.e. by the commutation circuit in question). For example, a first commutation circuit is used for energy levels up to a first threshold; a second commutation circuit is used for energy levels between the first threshold and a second threshold, and so on. Consequently, one inverter may be used for a wide variety of load and current conditions.

According to another aspect of the invention, the object is achieved by the initially described method, wherein the method involves measuring a capacitor voltage over the recovery capacitor in a phase of the cyclic procedure. The method further involves checking the capacitor voltage against a set limit level representing a voltage below a maximal allowed voltage over the recovery capacitor. If the capacitor voltage is less than the set limit level, method involves controlling the energy-flow control means to cause an amount of energy to be taken out from the recovery capacitor in a subsequent phase of the cyclic procedure, which amount of energy is estimated to be less than the amount of energy taken out in a phase previous to the phase during which said capacitor voltage was measured. If, on the other hand, the capacitor voltage is greater than the set limit level, the method involves controlling the energy-flow control means to cause an amount of energy to be taken out from the recovery capacitor in the subsequent phase of the cyclic procedure, which amount of energy is estimated to be larger than the amount of energy taken out in the phase previous to the phase during which said capacitor voltage was measured. This method is advantageous because it enables adaptation of the capacitor voltage, so that the recovery capacitor always stores an optimal amount of energy.

According to one preferred embodiment of this aspect of the invention, if the capacitor voltage is equal to the set limit level, the method involves controlling the energy-flow control means to cause an amount of energy to be taken out from the recovery capacitor in the subsequent phase of the cyclic procedure, which amount of energy is estimated to be equal to the amount of energy taken out in the phase previous to the phase during which said capacitor voltage was measured. Hence, the energy amount stored in the recovery capacitor can be maintained at an optimal level.

According to a further aspect of the invention, the object is achieved by a computer program, which is loadable into the internal memory of a computer, and includes software for controlling the above proposed method when the program is run on a computer.

According to another aspect of the invention, the object is achieved by a computer readable medium, having a program recorded thereon, where the program is to control a computer to perform the above-proposed method.

Further advantages, advantageous features and applications of the present invention will be apparent from the following description and the dependent claims.

BRIEF DESCRIPTION OF THE DRAWINGS

The invention is now to be explained more closely by means of preferred embodiments, which are disclosed as examples, and with reference to the attached drawings.

DESCRIPTION OF THE PRIOR ART

Figure 1:
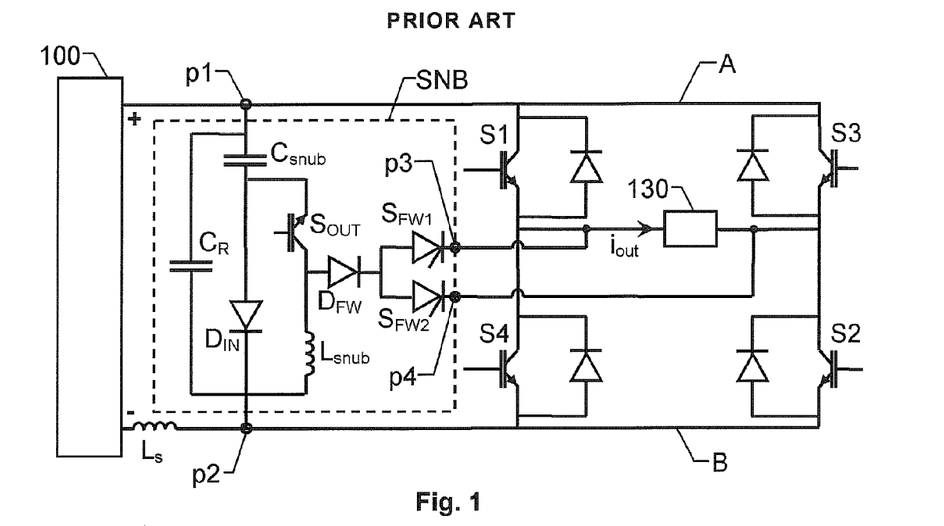
FIG. 1 shows a circuit diagram over a prior-art inverter.

We refer initially to FIG. 1, which shows a circuit diagram over the prior-art inverter as known from the above-mentioned document EP 1 422 011. The inverter provides for a switched welding-type power supply and includes a DC power source 100, a snubber circuit SNB and a bridge circuit, which provides alternating current $i_{out}$ to a load 130 in the form of a welding torch and work piece.

Specifically, the bridge circuit in the known inverter includes a set of switches S1, S2, S3 and S4 that are arranged between a first line + and a second line − from the DC power source 100. The switches are controlled in a pair-wise alternating manner, such that a first pair of switches S1 and S2 leads the output current $i_{out}$ through the load 130 in a forward direction, and a second pair of switches S3 and S4 leads the output current $i_{out}$ through the load 130 in the opposite direction.

The snubber circuit SNB is a so-called four-pole having a first pole p1 connected to the first line + and a second pole p2 connected to the second line −. Third and fourth poles p3 and p4 are connected to a respective side of the load 130 for providing freewheeling current there through. The snubber circuit SNB includes a recovery capacitor $C_R$, a snubber capacitor $C_{snub}$, first and second diodes $D_{IN}$ and $D_{FW}$ respectively, a transistor switch $S_{OUT}$, a snubber inductor $L_{snub}$ and a pair of freewheeling switches $S_{FW1}$ and $S_{FW2}$ respectively. The snubber circuit SNB recovers energy from the snubber capacitor $C_{snub}$ when the snubber capacitor voltage exceeds a predetermined voltage, say 300 volts. The energy is recovered using the snubber inductor $L_{snub}$ in series with the switch $S_{OUT}$. When the switch $S_{OUT}$ is on, it completes a circuit including the snubber inductor $L_{snub}$, the switch $S_{OUT}$, the snubber capacitor $C_{snub}$, the "ON" leg of the inverter bridge (e.g. S1 and S2) and the load 130. The switch $S_{OUT}$ is turned on when the snubber capacitor voltage exceeds the threshold, and turned off when the voltage drops below the threshold or another threshold (so that hysteresis is accomplished). While the switch $S_{OUT}$ is on, current flows through the snubber inductor $L_{snub}$ recovering energy from the snubber capacitor $C_{snub}$. When the switch is turned off, energy stored in the snubber inductor $L_{snub}$ is returned to the load 130 through a freewheeling path including the second diode $D_{FW}$ and one of the freewheeling switches $S_{FW1}$ or $S_{FW2}$ (depending on the direction of the output current $i_{out}$) until the energy is recovered.

In addition to the circuit complexity resulting from the freewheeling switches $S_{FW1}$ and $S_{FW2}$, the prior-art design has a negative influence on the rapidity with which the direction of the output current $i_{out}$ can be altered. Namely, since the snubber inductor $L_{snub}$ operates as temporary energy storage, this impedes any changes of the current through the switch $S_{OUT}$. In other words, the snubber inductor $L_{snub}$ limits the time derivative of the output current $i_{out}$ during the commutation cycle. This effect becomes especially pronounced at high output currents $i_{out}$ and/or for loads 130 having high inductance.

DESCRIPTION OF PREFERRED
EMBODIMENTS OF THE INVENTION

As will be evident from the below, none of the embodiments of the invention discussed with reference to FIG. 2a, 2b, 3a, 3b, 4a, 4b, 5a, 5b, 6a, 6b or 7 suffers from this undesired effect.

Figure 2A:
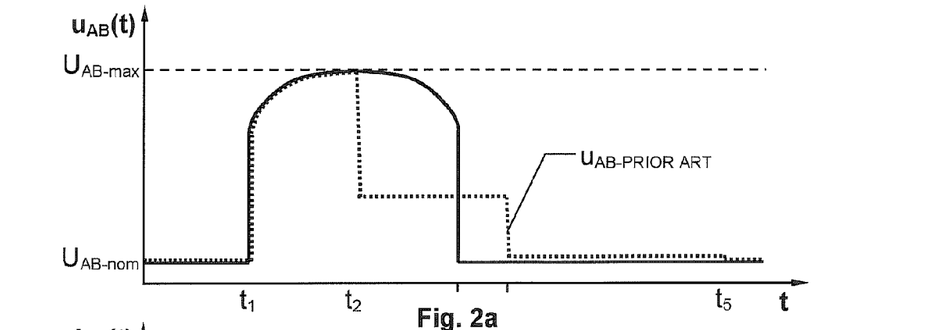
FIGS. 2a-b show graphs illustrating how the output current varies in response to variations in the bus voltage of the inverter bridge for a prior-art solution and the embodiments of the invention respectively.
Figure 2B:
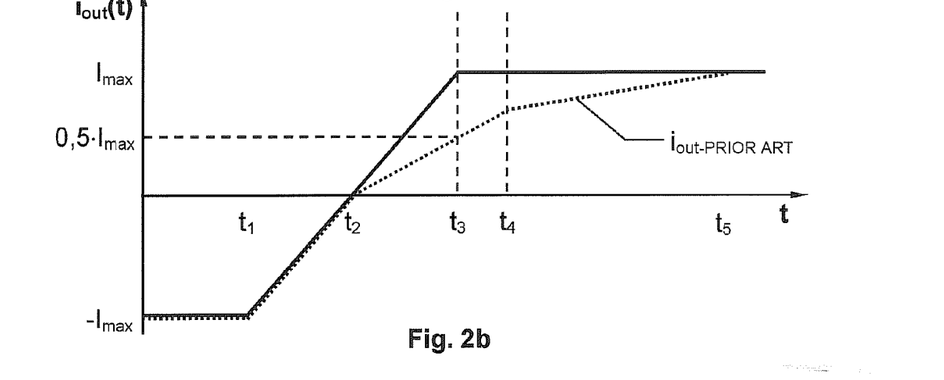

FIG. 2a shows two separate graphs over bus voltages $u_{AB}(t)$ across the bus lines as functions of time t. A first graph (dotted line) represents the bus voltage $u_{AB}(t)$ for a hypothetical inverter design, however essentially as described above with reference to FIG. 1; and a second graph (bold line) represents a bus voltage $u_{AB}(t)$ that may be applied according to the embodiments of the invention described in this application. FIG. 2b shows graphs representing output currents $i_{out}(t)$ as functions of time t corresponding to the bus voltages $u_{AB}(t)$ of FIG. 2a.

At a first point in time $t_1$, the bus voltage $u_{AB}(t)$ is raised from an initial level $U_{AB-nom}$, and at a second point in time $t_2$ the bus voltage $u_{AB}(t)$ reaches a maximum value $U_{AB-max}$. During this interval, we presume that the bus voltage $u_{AB}(t)$ of the prior-art design and the embodiments of the invention have essentially the same shape.

Up until the first point in time $t_1$, the output current $i_{out}(t)$ has a maximum negative value $-I_{max}$ (i.e. has a maximum magnitude and a flow direction opposite to the arrow in FIG. 1). In response to the step in the bus voltage $u_{AB}(t)$ at $t_1$, the output current $i_{out}(t)$ starts to ramp down (in order to be reversed). At the second point in time $t_2$, the output current $i_{out}(t)$ is zero for the prior-art design as well as for the embodiments of the invention.

In the prior-art design, the bus voltage $u_{AB}(t)$ is stepped down to an intermediary level at the second point in time $t_2$. Such an early voltage decrease in combination with the snubber inductor $L_{snub}$ and its stored energy in the current path slow down the reversing of the output current $i_{out}(t)$ significantly.

However, according to the embodiments of the invention, the bus voltage $u_{AB}(t)$ is lowered to the initial level $U_{AB-nom}$ around a third point in time $t_3$ after the second point in time $t_2$. Thereafter, the bus voltage $u_{AB}(t)$ preferably remains at the initial level $U_{AB-nom}$ until a subsequent cycle of the procedure.

In the prior-art design, the bus voltage $u_{AB}(t)$ remains at the intermediary level until a fourth point in time $t_4$ after the third point in time $t_3$. This is necessary to drive the output current $i_{out}(t)$ to a comparatively high level. Nevertheless, as can be seen in FIG. 2b, at the fourth point in time $t_4$, the output current $i_{out}(t)$ has still not reached an adequate level. Therefore, between the fourth point in time $t_4$ and a yet later point in time $t_5$, the DC power source 100 must supplement with additional energy, such that the output current $i_{out}(t)$ reaches a maximum positive value $I_{max}$.

Both in the prior-art design and according to the embodiments of the invention the output current $i_{out}(t)$ ramps up and starts to flow in the opposite direction through the load 130 at the second point in time $t_2$. According to the embodiments of the invention, this ramping up is essentially as quick as the ramping down between the first and second points in time $t_1$ and $t_2$. I.e. the duration between the first and second points in time $t_1$ and $t_2$ is approximately the same as the duration between the second and third points in time $t_2$ and $t_3$. In the prior-art design, however, at the third point in time $t_3$ the output current $i_{out}(t)$ has only reached about half the maximum positive value $I_{max}$. In other words, for a given voltage step $U_{AB-max}$ on the bus, ramping up the output current $i_{out}(t)$ from zero to a maximum positive value $I_{max}$ would, prima facie, take about twice as long time for the prior-art design. This assumption is true provided that the snubber inductor $L_{snub}$ has an inductance approximately equal to the inductance of the load 130.

According to the embodiments of the invention, the ramping up of the output current $i_{out}(t)$ from zero to the maximum positive value $I_{max}$ takes less time, since the bus voltage $u_{AB}(t)$ can be held longer at higher levels. Naturally, this is advantageous with respect to commutation speed. Moreover, the power level will show less variation.

If, in the prior-art design a ramp up time of the output current $i_{out}(t)$ from zero to $I_{max}$ is desired, which ramp up time corresponds to that of the embodiments of the invention, the maximum bus voltage $U_{AB-max}$ must be elevated substantially. This, in turn, would result in a considerable cost increase due to the higher voltage requirements on the components included.

Figure 3A:
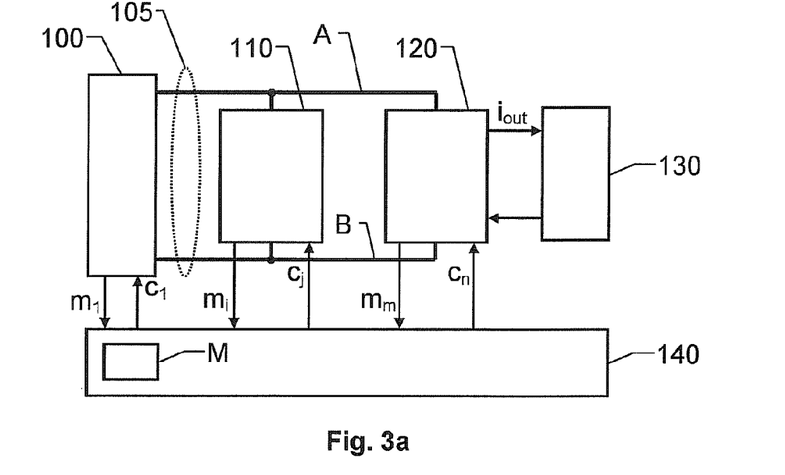
FIGS. 3a-b show a block diagram and a circuit diagram respectively over an inverter according to a first embodiment of the invention.

FIG. 3a shows a block diagram over an inverter according to a first embodiment of the invention. The inverter is adapted to provide alternating current $i_{out}$ to a load 130. According to the invention, it is presumed that the load 130 includes a welding circuit. Thus, the load 130 may contain a variety of components and elements, such as current conductors, torch, arc and clamps (and the resistances, inductances and capacitances associated with these components and elements).

The proposed inverter includes at least one commutation circuit 110 and a bridge circuit 120. The at least one commutation circuit 110 is configured to receive power from a DC power source 100, receive energy from inductive elements in the load 130 during a storage phase of a cyclic procedure, and control energy feedback to the load 130 during a feedback phase of the cyclic procedure. Typically, this involves variation of a voltage over a bus 105 of the DC power source 100.

The commutation and bridge circuits 110 and 120 respectively and the operation of the proposed inverter will be described in detail below with reference to FIGS. 3b through 7. However, generally, the commutation circuit 110 contains a recovery capacitor and energy-flow control means configured to control energy storage in and energy take-out from the recovery capacitor. The bridge circuit 120 is connected to the at least one commutation circuit 110. The bridge circuit 120 is configured to deliver the alternating current $i_{out}$ to the load 130, which is thus galvanically connected to the bus 105 via the bridge circuit 120. The commutation circuit 110 is a two-pole having a respective pole connected to each of a first node A and a second node B. The commutation circuit 110 is arranged to receive energy from the load 130 and feedback energy to the load 130 via the first and second nodes, either directly or via the bridge circuit 120. Here, of course, the term "two-pole" refers to the power circuit, i.e. the commutation circuit 110 may also include a number of additional interfaces for measurement and control signals.

The inverter may include, or be associated with, a control unit 140. This unit, in turn, receives at least one measurement signal $m_1$ and $m_m$ from the DC power source 100, the commutation circuit 110 and the bridge circuit 120. The measurement signals $m_1$, $m_i$ and $m_m$ reflect the current status of the inverter. In response to the measurement signals $m_1$, $m_i$ and $m_m$, the control unit 140 generates a set of control signals $c_1$, $c_j$ and $c_n$ to the DC power source 100, the commutation circuit 110 and the bridge circuit 120 for controlling the behavior of the inverter. Preferably, the control unit 140 includes, or is associated with, a memory module M storing software for controlling the inverter according to the principles to be described below (i.e. essentially to receive the measurement signals $m_1$, $m_i$ and $m_m$ and generate the control signals $c_1$, $c_j$ and $c_n$).

Figure 3B:
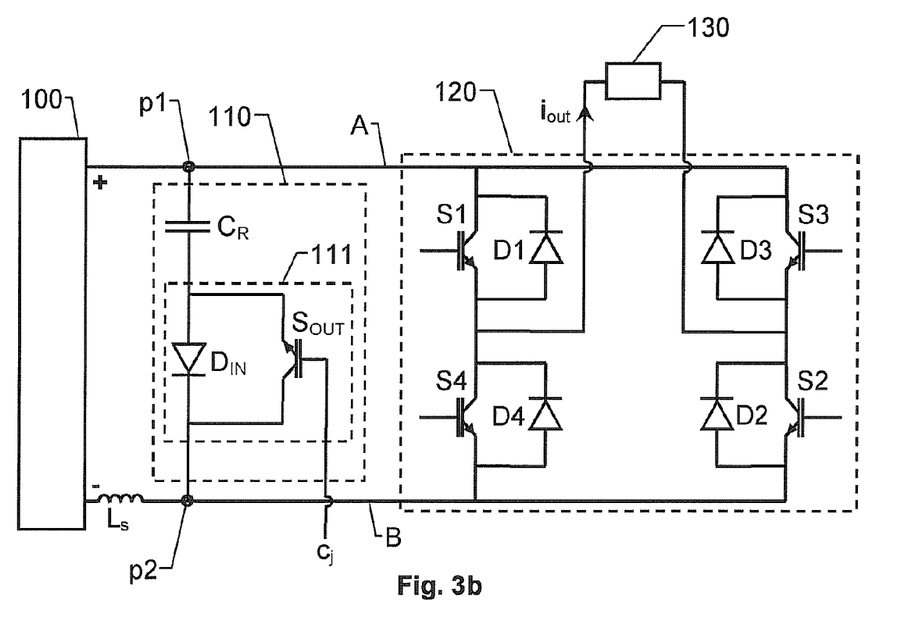

Referring now to FIG. 3b, we see a circuit diagram over the inverter according to the first embodiment of the invention. The inverter provides alternating current $i_{out}$ to the load 130, which contains a welding circuit. The current $i_{out}$ varies according a cyclic procedure.

In this embodiment of the invention, the commutation circuit 110 and the bridge circuit 120 are both connected to the bus 105 of the DC power source 100. Here, the bus 105 is represented by a first line + and a second line –. The bus 105 is further galvanically connected to the load 130 via the bridge circuit 120. Thus, for example, there is no transformer means between the DC power source 100 and the load 130. However, the galvanic connection may include a diode, a transistor and/or any other type of switching means.

The bridge circuit 120 is connected to the commutation circuit 110 via the bus 105, and the bridge circuit 120 is configured to deliver the alternating current $i_{out}$ to the load 130 in response to control signals, for instance originating from the control unit 140. The bridge circuit 120 includes four main switching modules S1, S2, S3 and S4 respectively, which are arranged in a full (or H-) bridge configuration between the first and second nodes A and B. The main switching modules are configured to be controlled in a pair-wise alternating manner. This means that a first pair S1 and S2 of the main switching modules is configured to cause the output current $i_{out}$ to flow in a first direction through the load 130 (as indicated by the arrow in FIG. 3b), and a second pair S3 and S4 of the main switching modules is configured to cause the output current $i_{out}$ to flow in the opposite direction through the load 130 (i.e. against the arrow in FIG. 3b).

The commutation circuit 110 is configured to receive power from the DC power source 100, during a storage phase of a cyclic procedure receive energy from inductive elements in the load 130, and during a feedback phase of the cyclic procedure control energy feedback to the load 130. The commutation circuit 110 is a two-pole having a first pole p1 connected to the first node A and a second pole p2 connected to a second node B. The first node A is further connected to a first line + of the bus 105, and the second node B is further connected to a second line – of the bus 105. As mentioned above, in addition to the first and second poles p1 and p2 of the power circuit, the commutation circuit 110 may preferably include a set of measurement and control interfaces for controlling the operation of at least one switch therein. The commutation circuit 110 includes a recovery capacitor $C_R$ and energy-flow control means configured to control energy storage in and energy take-out from the recovery capacitor $C_R$. In this embodiment of the invention, the energy-flow control means are represented by a first flow control means in the form of a diode $D_{IN}$ and a second flow control means in the form of a transistor switch $S_{OUT}$.

Figure 6A:
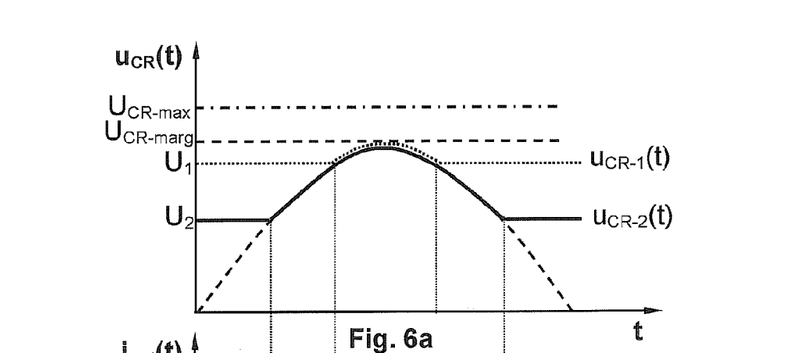
FIGS. 6a-b show graphs illustrating a relationship between the recovery capacitor voltage and the output current according to the embodiments of the invention.
Figure 6B:
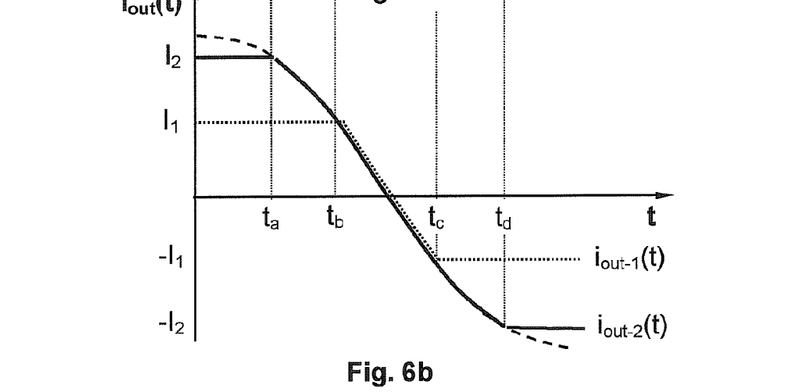

The diode $D_{IN}$ is configured to allow energy to be stored in the recovery capacitor $C_R$. This role can be illustrated with reference to FIGS. 6a and 6b showing a voltage $u_{CR}(t)$ over the recovery capacitor $C_R$ as a function of time t and the output current $i_{out}(t)$ as a function of time t respectively. Let us assume that the output current $i_{out}(t)$ has a maximum positive value of $I_1$. This output current $i_{out}(t)$ gives rise to a voltage $U_1$ over the recovery capacitor $C_R$. At first, the output current $i_{out}(t)$ is held constant at $I_1$, and therefore the voltage $u_{CR}(t)$ has a constant value. However, at a point in time $t_b$, reversal of the output current $i_{out}(t)$ is initiated. Consequently, the output current $i_{out}(t)$ drops, the diode $D_{IN}$ allows energy to be fed into the recovery capacitor $C_R$ and the voltage $u_{CR}(t)$ there over starts to increase. The voltage $u_{CR}(t)$ reaches a peak value, and then starts to decrease again. This is an effect of that the output current $i_{out}(t)$ begins to flow in the opposite direction through the load 130 and the transistor switch $S_{OUT}$, which is closed.

At a later point in time $t_c$, the transistor switch $S_{OUT}$ is controlled to an open state, for instance via a control signal $c_j$ from the control unit 140. As a result, the voltage $u_{CR}(t)$ over the recovery capacitor $C_R$ is conserved at the level it had at $t_c$ (which typically is approximately equal to the initial constant value $U_1$). At $t_c$, the output current $i_{out}(t)$ also attains a maximum negative value of $-I_1$, which is maintained until reversal of the output current $i_{out}(t)$ again is initiated. Accordingly, the transistor switch $S_{OUT}$ causes energy having been temporarily stored in the recovery capacitor $C_R$ to be fed into the load 130 during certain phases of the cyclic procedure, which may be referred to as feedback phases. Thus, the inverter design enables high power efficiency and quick reversal of the output current $i_{out}(t)$.

If instead the output current $i_{out}(t)$ has a maximum positive value of $I_2$ that is higher than then the voltage $u_{CR}(t)$ would have to start at a constant value $U_2$ below $U_1$. Namely, in such a case (for a given frequency of the cyclic procedure), the reversal of the output current $i_{out}(t)$ must start at an earlier point in time $t_a$ (i.e. prior to $t_b$); and at the same time, the diode $D_{IN}$ will initiate the input of energy into the recovery capacitor $C_R$. Consequently, the recovery capacitor $C_R$ will receive more energy before the voltage $u_{CR}(t)$ over recovery capacitor $C_R$ reaches the peak value. After having reached the peak voltage, the transistor switch $S_{OUT}$ allows energy to leave the recovery capacitor $C_R$ and be fed into the load 130. At a point in time $t_d$ (after $t_c$), the transistor switch $S_{OUT}$ is controlled to an open state, and the voltage $u_{CR}(t)$ over the recovery capacitor $C_R$ is conserved approximately at $U_2$.

Returning now to FIG. 3b, the energy-flow control means $D_{IN}$ and $S_{OUT}$ are preferably arranged in a switching module 111, where the first flow control means $D_{IN}$ is connected in parallel with the second flow control means $S_{OUT}$. This design renders it very straightforward to control the flow of energy into and out from the recovery capacitor $C_R$. Further preferably, the switching module 111 is connected in series with the recovery capacitor $C_R$.

It is likewise advantageous if the bus 105 includes a smoothing inductor $L_S$ in at least one of the first and second lines + or – (as illustrated in FIG. 3b). The smoothing inductor $L_S$ is configured to suppress voltage ripple on the bus 105 and thus improve the quality of the power delivered from the inverter.

Additionally, it is preferable to employ a particular start-up procedure in order to build up an adequate voltage $u_{CR}(t)$ over recovery capacitor $C_R$. This may involve execution of a first number of reversals of the output current $i_{out}(t)$ without feeding energy back to the load 130, or short-circuiting the bus 105 briefly at the beginning of the welding operation.

Figure 4A:
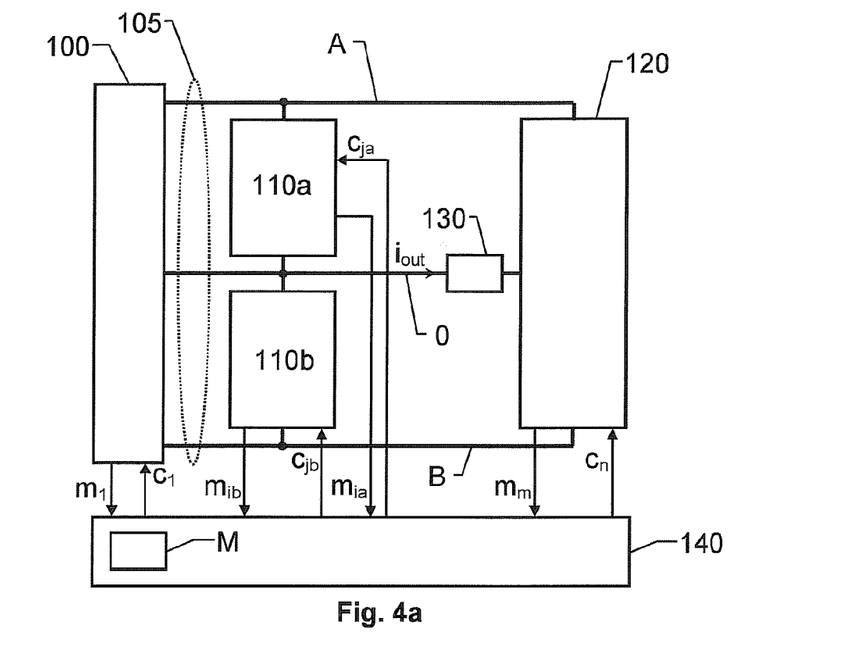
FIGS. 4a-b show a block diagram and a circuit diagram respectively over an inverter according to a second embodiment of the invention.
Figure 4B:
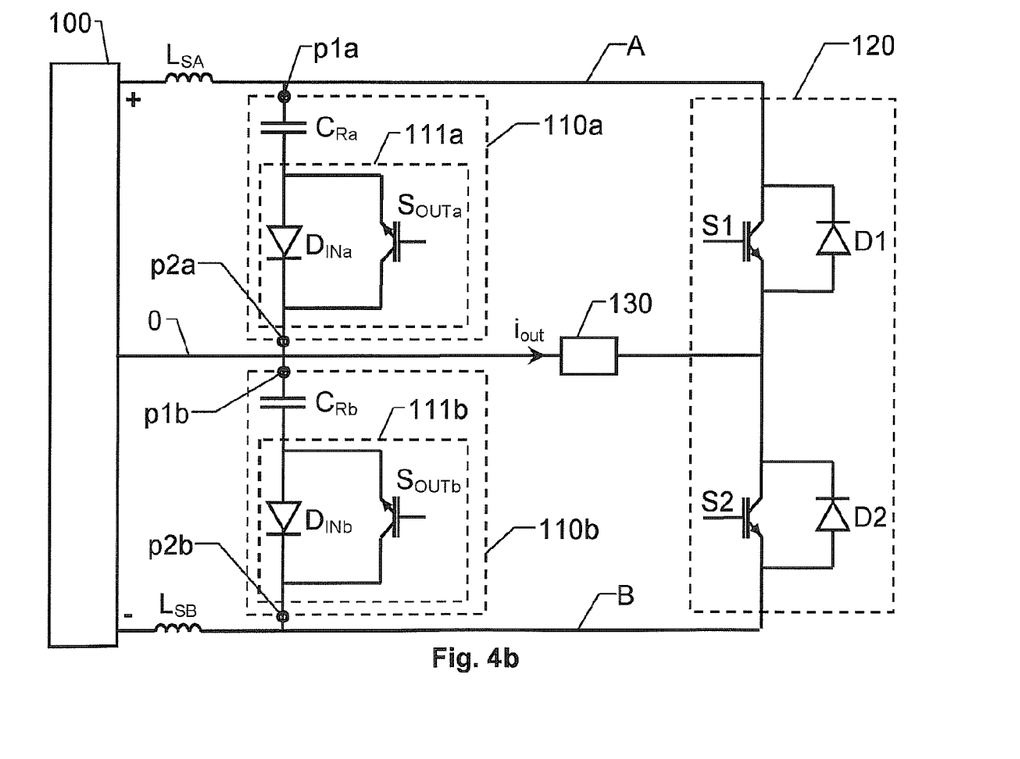

FIG. 4a shows a block diagram over an inverter according to a second embodiment of the invention, and FIG. 4b shows a corresponding circuit diagram.

In this embodiment, a DC power source 100 has a bus 105 containing a first line +, a second line – and a center-point line 0. The first line + has a first voltage level, the second line – has a second voltage level and the center-point line 0 has a voltage level (say zero or ground voltage) between the first and second voltage levels.

Analogous to the above, one bridge circuit 120 is included. Here, however, the inverter has two commutation circuits 110a and 110b respectively. Both the latter function as described above with reference to FIG. 3b, and each circuit 110a and 110b may have the same configuration as the circuit 110. The first commutation circuit 110a has its first pole p1a connected to a first node A and its second pole p2a connected to the center-point line 0. The second commutation circuit 110b has its first pole p1b connected to the center-point line 0 and its second pole p2b connected to a second node B. The first node A is further connected to the first line + and second node B is further connected to the second line –.

In the second embodiment of the invention, the bridge circuit 120 includes two main switching modules S1 and S2 respectively that are arranged in a half bridge configuration between the first and second nodes A and B respectively. The main switching modules S1 and S2 are configured to be controlled in an alternating manner, such that a first main switching module S1 causes the output current $i_{out}$ to flow in a first direction through the load 130 (against the arrow in FIG. 4b), and a second main switching module S2 causes the output current $i_{out}$ to flow in a second direction through the load 130 (as indicated by the arrow in FIG. 4b).

Figure 5A:
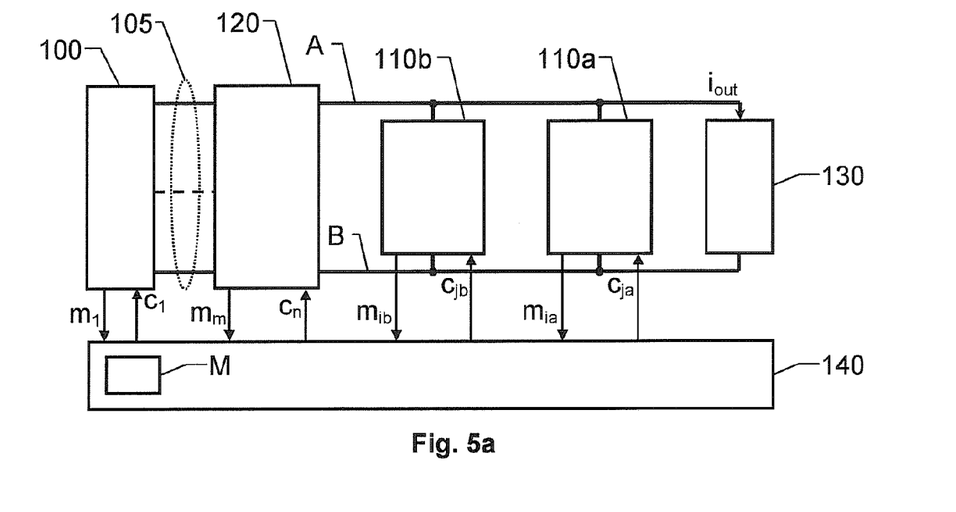
FIGS. 5a-b show a block diagram and a circuit diagram respectively over an inverter according to a third embodiment of the invention.
Figure 5B:
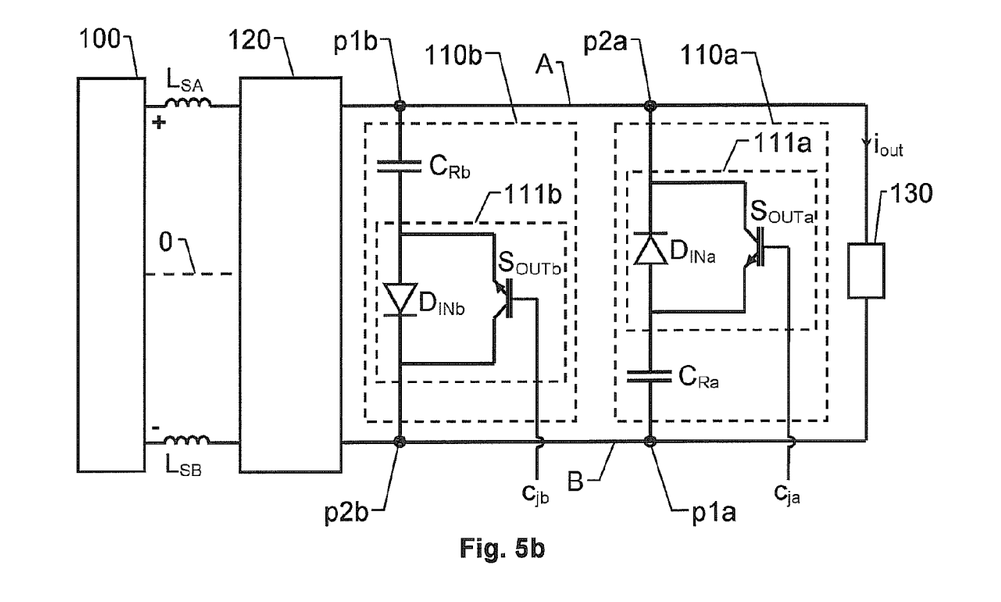

FIG. 5a shows a block diagram over an inverter according to a third embodiment of the invention, and FIG. 5b shows a corresponding circuit diagram. Here, in similarity to the above, a DC power source 100 has a bus 105, which is arranged to forward power from the DC power source 100 to a load 130 being galvanically connected thereto. A bridge circuit 120 is connected to the bus 105, and the bridge circuit 120 in turn, is connected with first and second commutation circuits 110a and 110b respectively.

The bridge circuit 120 may either include a full (H-) bridge (cf. the first embodiment described above with reference to FIGS. 3a and 3b), or include a half bridge (cf. the second embodiment described above with reference to FIGS. 4a and 4b). Therefore, the bridge circuit 120 is represented in block form also in FIG. 5b. The alternative configurations of the circuit are apparent from the first and second embodiments of the invention illustrated in FIGS. 3b and 4b respectively. If the bridge circuit 120 includes a full (H-) bridge, the bus 105 only includes first and second lines + and –. However, if the bridge circuit 120 includes a half bridge, the bus 105 also includes a center-point line 0 as illustrated with dashed lines in FIGS. 5a and 5b.

In any case, the commutation circuits 110a and 110b are both arranged between a first node A and a second node B of the bridge circuit 120. The first and second commutation circuits 110a and 110b are also arranged anti-parallel over the load 130. This means that the first commutation circuit 110b has the first pole p1b connected to the first node A and the second pole p2b connected to the second node B. The first commutation circuit 110b is configured to store energy from the load 130 when the output current $i_{out}$ has a first flow direction through the load 130 (against the arrow in FIG. 5b) and feed back energy to the load 130 when the output current $i_{out}$ has a second flow direction through the load 130 (as indicated by the arrow in FIG. 5b). The second commutation circuit 110a, on the other hand, has the first pole p1a connected to the second node B and the second pole p2a connected to the first node A. Thus, the second commutation circuit 110a is configured to store energy from the load 130 when the output current $i_{out}$ has the second flow direction through the load 130 and feed back energy to the load 130 when the output current $i_{out}$ has the first flow direction through the load 130.

The first commutation circuit 110b is configured to store energy from the load 130 in a first recovery capacitor $C_{Rb}$ during a storage phase, and feed back energy from this capacitor to the load 130 during a feedback phase. The energy feed-in and take-out from the first recovery capacitor $C_{Rb}$ is controlled via a first switching module 111b. Preferably, the first switching module 111b includes a first flow control means $D_{INb}$ configured to allow energy to be stored in the first recovery capacitor $C_{Rb}$ and a second flow control means $S_{OUTb}$ configured to cause energy stored in the first recovery capacitor $C_{Rb}$ to be fed into the load 130. The second commutation circuit 110a is configured to store energy from the load 130 in a second recovery capacitor $C_{Ra}$, during a storage phase, and feed back energy from this capacitor to the load 130 during a feedback phase. The energy feed-in and take-out from the second recovery capacitor $C_{Ra}$ is controlled via a second switching module 111a. Preferably, the second switching module 111a includes a third flow control means $D_{INa}$ configured to allow energy to be stored in the second recovery capacitor $C_{Ra}$ and a fourth flow control means $S_{OUTa}$ configured to cause energy stored in the second recovery capacitor $C_{Ra}$ to be fed into the load 130.

It should be noted that the third embodiment of the invention is somewhat disadvantageous compared to the first and second embodiments. Namely, according to the design of the third embodiment, the energy stored in any smoothing inductance $L_{SA}$ and/or $L_{SB}$ cannot be fed back to the load 130 Instead, this energy will be lost in the form of heat.

Analogous to the first embodiment of the invention described in FIG. 3a, the inverter according to the second and third embodiments may include, or be associated with, a control unit 140 as shown in FIGS. 4a and 5a respectively. The control unit 140 is configured to receive at least one measurement signal $m_1$, $m_{ia}$, $m_{ib}$ and $m_m$ from the DC power source 100, the commutation circuits 110a respective 110b and the bridge circuit 120. The measurement signals $m_1$, $m_{ia}$, $m_{ib}$ and $m_m$ reflect the current status of the inverter. In response to the measurement signals $m_{ia}$, $m_{ib}$ and $m_m$, the control unit 140 generates a set of control signals $c_1$, $c_{ja}$, $c_{jb}$ and $c_n$ to the DC power source 100, the commutation circuits 110a respective 110b and the bridge circuit 120 for controlling the behavior of the inverter. Preferably, the control unit 140 includes, or is associated with, a memory module M storing software for controlling the inverter according to the principles to be described below (i.e. essentially to receive the measurement signals $m_1$, $m_{ia}$, $m_{ib}$ and $m_m$ and generate the control signals $c_1$, $c_{ja}$, $c_{jb}$ and $c_n$).

Preferably, in the above-described embodiments of the invention, a smoothing inductor $L_{SA}$ and/or $L_{SB}$ is included in one or both of the first and second lines + and − as illustrated in FIGS. 4b and 5b, and/or in the center-point line 0 (not shown). The smoothing inductors $L_{SA}$ and $L_{SB}$ are configured to suppress voltage ripple on the bus 105 and thus provide less noisy energy to the inverter.

According to a further embodiment of the invention (not illustrated), the inverter includes at least two commutation circuits 110, which are coupled in parallel with one another over the bus 105, i.e. between the first and second nodes A and B, or between the first node A and the center-point line 0 respective between the center-point line 0 and the second node B depending on the inverter design. Each commutation circuit 110 is here adapted to a respective energy range to be handled. Thereby, a first commutation circuit can be used for energy levels up to a first threshold; a second commutation circuit is used for energy levels between the first threshold and a second threshold, and so on. Namely, a given size of recovery capacitor $C_R$ can only be optimized for a certain range of currents/load inductances. However, by having a bank of parallel commutation circuits 110 (each circuit having different characteristics) to choose from, it is possible to employ one inverter for a wide variety of load and current conditions.

Figure 7:
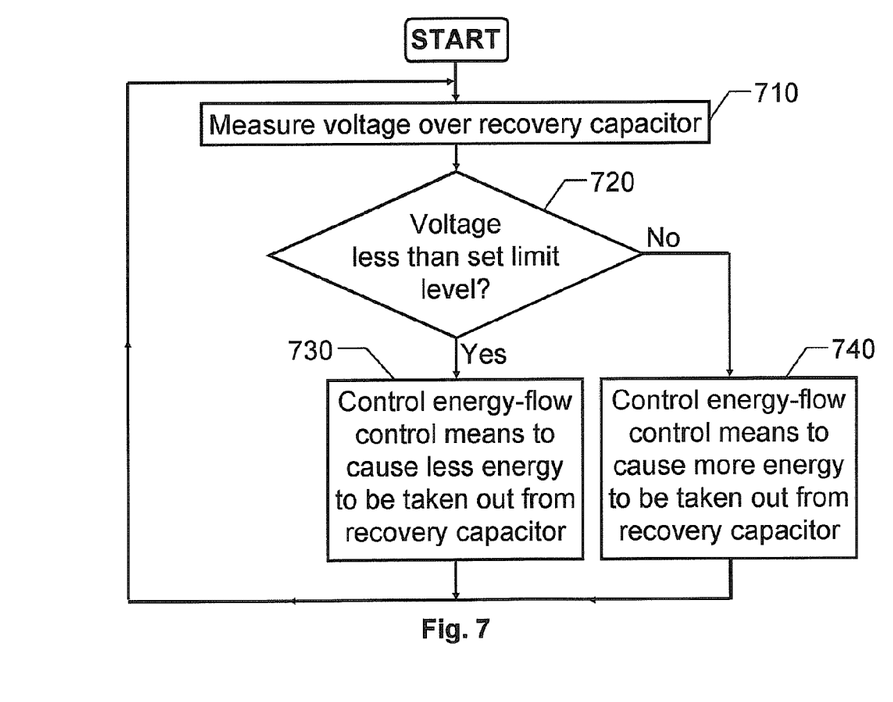
FIG. 7 illustrates, by means of a flow diagram, the general method according to the invention.

In order to sum up, we will now describe the method according to the invention with reference to the flow diagram in FIG. 7. Specifically, the method concerns tuning the recovery capacitor voltage $u_{CR}(t)$ such that the recovery capacitor $C_R$ stores a maximum amount of energy without risking that the components are damaged due to overcharging. Namely, this results in a largest possible energy feedback to the load 130.

A first step 710 measures the voltage over the recovery capacitor $C_R$ during a phase of the cyclic procedure. Preferably, the voltage is measured continuously (or at least repeatedly) and a peak value is registered. A step 720 then checks if the voltage measured in step 710 is less than a set limit level representing a maximal allowed voltage over the recovery capacitor $C_R$. Step 720 may either be executed after that a given phase of the cyclic procedure has ended, or be executed repeatedly during this phase.

If step 720 finds that the voltage over the recovery capacitor $C_R$ is less than the set limit level, a step 730 follows. Step 730 controls the energy-flow control means to cause more energy to be stored in the recovery capacitor $C_R$ than what was stored in the previous phase of the cyclic procedure. In FIG. 6a, this is equivalent to aborting the feed-out of energy from the recovery capacitor $C_R$ via the second flow control means $S_{OUT}$ at a somewhat earlier point in time (than $t_c$ or $t_d$ respectively), so that the constant voltage level of $u_{CR-1}(t)$ or $u_{CR-2}(t)$ on the right-hand side of the sinus peak becomes higher than on the left-hand side thereof.

If step 720 finds that the voltage over the recovery capacitor $C_R$ not is less than the set limit level (i.e. there is not adequate margin to the maximally acceptable voltage), a step 740 follows. Step 740 controls the energy-flow control means to cause less energy to be stored in the recovery capacitor $C_R$ than what was stored in the previous phase of the cyclic procedure. In FIG. 6a, this is equivalent to continuing the feed-out of energy from the recovery capacitor $C_R$ via the second flow control means $S_{OUT}$ until a somewhat later point in time (than $t_c$ or $t_d$ respectively), so that the constant voltage level of $u_{CR-1}(t)$ or $u_{CR-2}(t)$ on the right-hand side of the sinus peak becomes lower than on the left-hand side thereof.

After step 730 or 740, the procedure loops back to step 710.

Preferably, if step 720 finds that the voltage over the recovery capacitor $C_R$ is equal to the set limit voltage, the method involves controlling the energy-flow control means to cause an amount of energy to be taken out from the recovery capacitor $C_R$ in the subsequent phase of the cyclic procedure, which amount of energy is estimated to be equal to the amount of energy taken out from the recovery capacitor $C_R$ in the previous phase of the cyclic procedure. In FIG. 6a, this is equivalent to aborting the feed-out of energy from the recovery capacitor $C_R$ via the second flow control means $S_{OUT}$ at $t_c$ or $t_d$ respectively, so that the constant voltage level of $u_{CR-1}(t)$ or $u_{CR-2}(t)$ on the right-hand side of the sinus peak becomes equal to the constant voltage level on the left-hand side thereof. This is valid for a smoothing inductor inductance $L_S$, $L_{SA}$ and $L_{SB}$ being approximately zero, or negligible compared to the inductance of the load 130.

All of the process steps, as well as any sub-sequence of steps, described with reference to FIG. 7 above may be controlled by means of a programmed computer apparatus. Moreover, although the embodiments of the invention described above with reference to the drawings comprise computer apparatus and processes performed in computer apparatus, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The program may either be a part of an operating system, or be a separate application. The carrier may be any entity or device capable of carrying the program. For example, the carrier may comprise a storage medium, such as a Flash memory, a ROM (Read Only Memory), for example a DVD (Digital Video/Versatile Disk), a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

The term "comprises/comprising" when used in this specification is taken to specify the presence of stated features, integers, steps or components. However, the term does not preclude the presence or addition of one or more additional features, integers, steps or components or groups thereof.

The reference to any prior art in this specification is not, and should not be taken as, an acknowledgement or any suggestion that the referenced prior art forms part of the common general knowledge in Australia, or any other country.

The invention is not restricted to the described embodiments in the figures, but may be varied freely within the scope of the claims.

The invention claimed is:

1. An inverter for providing alternating current to a load including a welding circuit, the inverter comprising:
   at least one commutation circuit configured to: receive power from a DC power source, during a storage phase of a cyclic procedure receive energy from inductive elements in the load, and during a feedback phase of the cyclic procedure control energy feedback to the load; each of the at least one commutation circuit comprising a recovery capacitor and energy-flow control means configured to control energy storage in and energy take-out from the recovery capacitor; and
   a bridge circuit connected to the commutation circuit, the bridge circuit being configured to deliver the alternating current to the load, the bridge circuit being connected to a bus forwarding power from the DC power source, and the bus being galvanically connected to the load, wherein the at least one commutation circuit is a two-pole having a first pole connected to a first node and a second pole connected to a second node; and the at least one commutation circuit is arranged to receive energy from the load and feedback energy to the load via the first and second nodes either directly or via the bridge circuit, wherein the energy-flow control means are arranged in a switching module comprising:
   a first flow control means configured to allow energy to be stored in the recovery capacitor, and
   a second flow control means configured to cause energy stored in the recovery capacitor to be fed into the load, the switching module being connected in series with the recovery capacitor the first flow control means being connected in parallel with the second flow control means, and the second flow control means being controllable in response to a control signal designating an amount of energy to be taken out of the recovery capacitor in a subsequent phase of the cyclic procedure.

2. An inverter according to claim 1, wherein the first flow control means comprises a diode.

3. An inverter according to claim 2, wherein the second flow control means comprises a transistor.

4. An inverter according to claim 3, wherein the bridge circuit comprises four main switching modules arranged in a full bridge configuration between the first and second nodes; the main switching modules are configured to be controlled in a pair-wise alternating manner, such that a first pair of the main switching modules is configured to cause the output current to flow in a first direction through the load and a second pair of the main switching modules is configured to cause the output current to flow in a second direction through the load, the second direction being opposite to the first direction.

5. An inverter according to claim 1, wherein the bus comprises a center-point line having a voltage level between a first voltage level of the first line and a second voltage level of the second line, the inverter comprising:
   a first commutation circuit having the first pole connected to the first node and the second pole connected to the center-point line, and
   a second commutation circuit having the first pole connected to the center-point line and the second pole connected to the second node, and
   the bridge circuit comprises two main switching modules arranged in a half bridge configuration between the first and second nodes; the main switching modules are configured to be controlled in an alternating manner, such that a first main switching module is configured to cause the output current to flow in a first direction through the load and a second main switching module is configured to cause the output current to flow in a second direction through the load, the second direction being opposite to the first direction.

6. An inverter according to claim 1, comprising first and second commutation circuits arranged anti-parallel over the load, wherein:
   a first commutation circuit having the first pole connected to the first node and the second pole connected to the second node, the first commutation circuit being configured to store energy from the load when the output current has a first flow direction through the load and feedback energy to the load when the output current has a second flow direction through the load; and
   a second commutation circuit having the first pole connected to the second node and the second pole connected to the first node, the second commutation circuit being configured to store energy from the load when the output current has the second flow direction through the load and feedback energy to the load when the output current has the first flow direction through the load, the second flow direction being opposite to the first flow direction.

7. An inverter according to claim 1, wherein the bus comprises at least one smoothing inductor configured to suppress voltage ripple on the bus.

8. An inverter according to claim 1, comprising at least two commutation circuits coupled in parallel with one another over the first and second nodes, each of the at least two commutation circuits being adapted to a respective energy range to be handled.

9. A method of controlling an inverter to provide alternating current to a load including a welding circuit, the inverter comprising at least one commutation circuit and a bridge circuit connected to a bus forwarding power from a DC power source; the at least one commutation circuit being configured to receive power from the DC power source, receive energy from inductive elements in the load during a storage phase of a cyclic procedure, and control energy feedback to the load during a feedback phase of the cyclic procedure, each of the at least one commutation circuit comprising a recovery capacitor and energy-flow control means for controlling energy storage in and energy take-out from the recovery capacitor, the method comprising:
   measuring a capacitor voltage over the recovery capacitor in a phase of the cyclic procedure,
   checking the capacitor voltage against a set limit level representing a voltage below a maximal allowed voltage over the recovery capacitor,
   if the capacitor voltage is less than the set limit level, controlling the energy-flow control means to cause an amount of energy to be taken out from the recovery capacitor in a subsequent phase of the cyclic procedure, which amount of energy is estimated to be less than the amount of energy taken out in a phase previous to the phase during which said capacitor voltage was measured, and if the capacitor voltage is greater than the set limit level, controlling the energy-flow control means to cause an amount of energy to be taken out from the recovery capacitor in the subsequent phase of the cyclic procedure, which amount of energy is estimated to be larger than the amount of energy taken out in the phase previous to the phase during which said capacitor voltage was measured.

10. A method according to claim 9, wherein, if the capacitor voltage is equal to the set limit level, the method comprises controlling the energy-flow control means to cause an amount of energy to be taken out from the recovery capacitor in the subsequent phase of the cyclic procedure, which amount of energy is estimated to be equal to the amount of energy taken out in the phase previous to the phase during which said capacitor voltage was measured.

11. A system comprising an internal memory containing software for controlling the steps of claim 9 when said program is run on the computer.

12. A computer readable storage medium, having a program recorded thereon, wherein the program is to make a computer control the steps of claim 9 when the program is loaded into the computer.

* * * * *